United States Patent Office 3,223,705
Patented Dec. 14, 1965

3,223,705
SALTS OF 4,6-DIAMINO-1,2-DIHYDRO-2-LOWER ALKYL-1-ARYL-s-TRIAZINES
Edward F. Elslager, 4081 Thornoaks Drive, and Donald F. Worth, 1111 Paul St., both of Ann Arbor, Mich.
No Drawing. Filed Apr. 20, 1962, Ser. No. 188,985
5 Claims. (Cl. 260—249.9)

The present invention relates to salts of 4,6-diamino-1,2-dihydro-2-lower alkyl-1-aryl-s-triazines of the formula

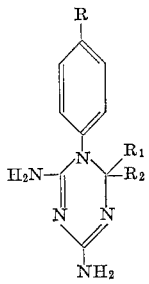

where R represents halogen, lower alkyl, lower alkoxy, benzyloxy, lower alkylthio or trifluoromethyl; $R_1$ represents lower alkyl and $R_2$ represents hydrogen or methyl; with an acid of the formula

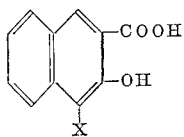

where X represents a 5'-methylene(6'-hydroxy-2'-naphthoic acid), 4' - methylene(1' - hydroxy - 2' - naphthoic acid), 4'-(3'-hydroxy-2'-naphthoic acid), 4'-benzylidene(3' - hydroxy - 2' - naphthoic acid), or 4' - ethylidene-(3'-hydroxy-2'-naphthoic acid) radical; with an acid of formula

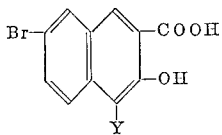

where Y represents a 4'-(7'-bromo-3'-hydroxy-2'-naphthoic acid), 4' - methylene(7' - bromo - 3' - hydroxy-2'-naphthoic acid), 4' - methylene(3' - hydroxy - 2' - naphthoic acid), 4' - methylene(1' - hydroxy - 2' - naphthoic acid) or 5'-methylene(6'-hydroxy - 2' - naphthoic acid) radical; with an acid of formula

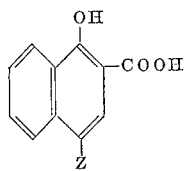

where Z represents a 4'-(1'-hydroxy-2'-naphthoic acid), 4' - methylene(1' - hydroxy - 2' - naphthoic acid) or 4' benzylidene(1' - hydroxy - 2' - naphthoic acid) radical; with an acid of formula Ar—S—Ar where Ar represents a 4-(3-hydroxy-2-naphthoic acid)

or 5-(2-hydroxybenzoic acid) radical; with an acid of formula

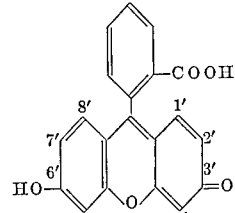

which can be substituted in the 2', 4', 5' or 7' positions with one or more halogen atoms or nitro groups; or with an acid of formula

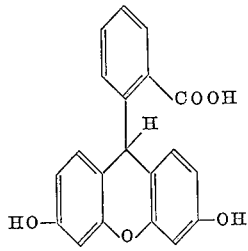

and to methods for their production. As used in the foregoing definitions, "halogen" designates a fluorine, chlorine, bromine or iodine atom and the lower alkyl radicals are those containing fewer than five carbon atoms.

The compounds of the invention are produced by reacting a 4,6-diamino-1,2-dihydro-2-lower alkyl-1-aryl-s-triazine of the foregoing formula with the appropriate acid mentioned above; or by reacting a soluble salt of the 4,6-diamino-1,2-dihydro-2-lower alkyl-1-aryl - s - triazine with a soluble salt of the appropriate acid. The term "soluble salt" is used herein in a relative sense and means a degree of solubility substantially greater than that exhibited by the products of the invention. Representative soluble salts of the triazine base suitable for use in the process of the invention include the hydrochloride, hydrobromide, hydriodide, sulfate, phosphate, sulfamate, acetate, lactate, tartrate, gluconate, citrate, and salicylate. Representative soluble salts of the acids described above suitable for use in the process of the invention include the alkali metal, alkaline earth metal, ammonium and amine salts. The invention comprehends the starting materials and final products in their hydrated as well as anhydrous forms. If desired, the starting materials used in the process can be converted in situ to the desired base, acid, or soluble salt form by treatment with an acid or base, as by neutralizing one or more of the carboxyl groups with base, by treatment of a carboxylate salt with a mineral acid, by treatment of an acid-addition salt with a base, or by treatment of the triazine base with an acid. The process of the invention is preferably carried out in a solvent in which the reactants are at least partially soluble and which is relatively unreactive toward each of the reactants. Suitable solvents include water, aqueous alkanols, dimethylacetamide, acetonitrile and mixtures thereof. Other satisfactory reaction media can be chosen from among a wide variety of solvents, particularly those which are neutral and polar. The salt formation proceeds fairly rapidly upon mixing the reactants in the selected solvent. The process can be carried out at room temperature or below, although in many cases a high yield and a crystalline form conducive to rapid filtration are facilitated by heating the reaction mixture for up to about an hour and then chilling it. The reactants are customarily employed in approximately the same ratio in which they appear in the desired final product. If it is desired to obtain the salt of the triazine base with one-half formula weight of the appropriate acid it is customary to employ these reactants or soluble salts thereof in the ratio of 2 moles of the former to 1 mole of the latter. If it is desired to obtain the salt of the triazine base with one formula weight of the desired acid best results are obtained by reacting a soluble salt of the triazine base with an equimolar quantity of a soluble salt (such as the disodium salt) of the appropriate acid in the presence of one equivalent of a mineral acid. In those cases where the reaction product precipitates directly, it is isolated by filtration or centrifugation. In those instances where it does not precipitate directly, it is first made insoluble by concentration of the reaction mixture or by dilution of the reaction mixture with a solvent in which the product is insoluble and then collected.

The 4,6-diamino-1,2-dihydro-2-lower alkyl-1 - aryl - s-triazines and their soluble salts used as starting materials in the practice of the invention can be prepared in various ways. They can be obtained by reacting a 1-arylbiguanide of the formula

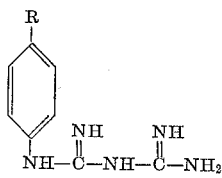

with a lower aliphatic aldehyde or ketone of the formula

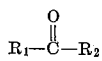

in the presence of a strong acid; where R, $R_1$ and $R_2$ are as defined before. The 1-arylbiguanides can be obtained by the reaction of an aniline derivative of the formula

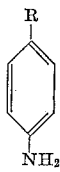

with dicyandiamide in the presence of a strong acid, where R is as defined before. Alternatively, the aniline derivative, the aldehyde or ketone and dicyandiamide are reacted in the presence of a strong acid and the desired triazine derivative is obtained directly. This method is preferred in those cases where $R_1$ and $R_2$ are both lower alkyl groups. The desired triazine derivative is obtained directly from the reaction mixture as an acid-addition salt or as the free base following basification.

The products of the invention are pharmacological agents which exhibit various advantages including lack of irritation at the site of injection when used parenterally, and unusually long duration of action. The products of the invention are useful primarily as repository antimalarial agents. Such compounds as 4,6-diamino-1-(p-chlorophenyl)-1,2-dihydro - 2,2-dimethyl-s-triazine hydrochloride and 4,6-diamino-1-(3,4-dichlorophenyl)-1,2-dihydro-2,2-dimethyl-s-trianzine hydrochloride are known to be highly active antimalarial agents, although their usefulness is limited by their extremely short duration of action. Even when administered at intervals of less than a week these compounds are too rapidly excreted to exhibit a sustained effect. In addition they are irritating upon injection. However, the products of the present invention possess high antimalarial activity, are non-irritating upon injection, and exhibit such long duration of action that the dosage interval can be extended to as long as several months without loss of protection against a malaria challenge. The products of the invention can be formulated into suspensions which are pharmaceutically acceptable for intramuscular injection, using suspending vehicles such as 40% benzyl benzoate–60% castor oil, or water containing emulsifying or dispersing agents.

The invention is illustrated by the following examples.

*Example 1*

A solution of 2.32 g. of 4,4'-benzylidenebis-(3-hydroxy-2-naphthoic acid) in a mixture of 80 ml. of water and 10 ml. of 1 N sodium hydroxide solution is poured into a warm solution of 2.90 g. of 4,6-diamino-1-(p-chlorophenyl)-2-ethyl-1,2-dihydro-s-triazine monohydrochloride in 40 ml. of water. The precipitate that forms is collected by filtration, washed thoroughly with warm water and dried in vacuo at 65° C. for 18 hours. Crystallization of the product from methanol-water gives the desired 4,6-diamino-1-(p-chlorophenyl)-2-ethyl-1,2-dihydro-s-triazine salt with ½ formula weight 4,4'-benzylidenebis (3-hydroxy-2-naphthoic acid) hemihydrate as pale yellow crystals, M.P. 214° C. (dec.).

In like manner, the following additional compounds are prepared from 4,4'-benzylidenebis(3 - hydroxy - 2 - naphthoic acid) and the appropriate dihydrotriazine hydrochloride:

4,6-diamino - 1-(p - chlorophenyl) - 1,2 - dihydro - 2,2-dimethyl-s-triazine salt with ½ formula weight 4,4'-benzylidenebis(3-hydroxy-2-naphthoic acid) hemihydrate; M.P. 200° C. (dec.).

4,6-diamino - 1 - (p-iodophenyl)-2,2-dimethyl-s-triazine salt with ½ formula weight 4,4'-benzylidenebis(3-hydroxy-2-naphthoic acid) ¾ hydrate; M.P. 209° C. (dec.).

4,6-diamino-1,2 - dihydro-2,2-dimethyl-1-(α,α,α-trifluoro-p-tollyl)-s-triazine salt with ½ formula weight 4,4'-benzylidenebis(3-hydroxy-2-naphthoic acid) 1⅓ hydrate; M.P. 207° C. (dec.).

4,6-diamino-1 - (p-ethylphenyl)-1,2-dihydro-2,2-dimethyl-s-triazine salt with ½ formula weight 4,4'-benzylidenebis(3-hydroxy-2-naphthoic acid) hemihydrate; M.P. indefinite beginning at 201° C. (dec.).

4,6-diamino-1-[p - (benzyloxy)phenyl]-1,2 - dihydro-2,2-dimethyl-s-triazine salt with ½ formula weight 4,4'-benzylidenebis(3-hydroxy-2-naphthoic acid); M.P. indefinite beginning at 192° C. (dec.).

4,6-diamino - 1,2-dihydro-2,2 - dimethyl - 1-[p - (methylthio)phenyl]-s-triazine salt with ½ formula weight 4,4'-benzylidenebis(3-hydroxy-2-naphthoic acid); M.P. indefinite beginning at 204° C. (dec.).

4,6-diamino - 1,2-dihydro-1-(p - methoxyphenyl) - 2,2-dimethyl-s-triazine salt with ½ formula weight 4,4'-benzylidenebis(3-hydroxy-2-naphthoic acid) hemihydrate; M.P. indefinite beginning at 199° C. (dec.).

*Example 2*

A solution of 1.90 g. of 2,2'-dihydroxy(1,1'-binaphthalene)-3,3'-dicarboxylic acid in 10 ml. of 1 N sodium hydroxide solution and 100 ml. of hot water is poured into a solution of 3.22 g. of 4,6-diamino-1,2-dihydro-2,2-dimethyl-1-(α,α,α-trifluoro-p-tolyl)-s-triazine monohydrochloride in 200 ml. of hot water. The precipitate is collected by filtration, washed with water and dried in vacuo at 65° C. Crystallization of the crude salt from methanol gives the desired 4,6-diamino-1,2 - dihydro - 2,2-dimethyl-1-(α,α,α-trifluoro-p-tolyl) - s - triazine salt with ½ formula weight 2,2'-dihydroxy(1,1'-binaphthalene)-3,3'-dicarboxylic acid ⅛ hydrate as pale yellow crystals, M.P. 231° C. (dec.).

4,6 - diamino - 1,2 - dihydro - 2,2-dimethyl-1-1-(α,α,α-trifluoro-p-tolyl)-s-triazine monohydrochloride employed as a starting material in the above procedure is prepared as follows: A mixture of 101 g. of α,α,α-trifluoro-p-tolyl-amine, 400 ml. of acetone, 60 ml. of concentrated hydrochloric acid, 56.5 g. of dicyandiamide and 20 ml. of methanol is stirred and boiled under gentle reflux for 18 hours.

Upon cooling, the colorless crystals are collected by filtration, washed thoroughly with acetone and dried in vacuo at 45° C. for 18 hours. This is the desired 4,6-diamino - 1,2 - dihydro - 2,2 - dimethyl - 1 - ($\alpha,\alpha,\alpha$ - trifluoro-p-tolyl)-s-triazine monohydrochloride; M.P. 226–227° C. (dec.).

In like manner the following additional compounds are prepared from 2,2'-dihydroxy(1,1'-binaphthalene)-3,3'-dicarboxylic acid and the appropriate dihydrotriazine hydrochloride.

4,6 - diamino - 1-(p-chlorophenyl) - 1,2 - dihydro-2,2-dimethyl-s-triazine salt with ½ formula weight 2,2'-dihydroxy(1,1' - binaphthalene) - 3,3'-dicarboxylic acid monohydrate; M.P. 210° C. (dec.).

4,6 - diamino - 1 - (p - chlorophenyl) - 2 - ethyl-1,2-dihydro-s-triazine salt with ½ formula weight 2,2'-dihydroxy(1,1' - binaphthalene) - 3,3'-dicarboxylic acid; M.P. indefinite beginning at 253° C. (dec.).

4,6 - diamino - 1,2 - dihydro - 1 - (p-idophenyl)-2,2-dimethyl-s-triazine salt with ½ formula weight 2,2'-dihydroxy(1,1' - binaphthalene) - 3,3'-dicarboxylic acid; M.P. indefinite beginning at 224° C. (dec.).

4,6 - diamino-1,2-dihydro-2,2-dimethyl-1-[p-(methylthio)phenyl] - s - triazine salt with ½ formula weight 2,2'-dihydroxy(1,1' - binaphthalene-3,3' - dicarboxylic acid; M.P. indefiinite beginning at 191° C. (dec.).

*Example 3*

To a warm solution of 2.88 g. of 4,6-diamino-1-(p-chlorophenyl) - 1,2 - dihydro 2,2-dimethyl - s - triazine monohydrochloride in 40 ml. of water is added a solution of 1.94 g. of 3,1'-dihydroxy-4,4'-methylenedi - 2 - naphthoic acid in 10 ml. of 1 N sodium hydroxide solution and 20 ml. of water. The precipitate is collected by filtration, washed thoroughly with water and dried in vacuo at 55° C. Crystallization from methanol-water gives the desired 4,6 - diamino-1-(p-chlorophenyl)-1,2-dihydro-2,2-dimethyl-s-triazine salt with ½ formula weight 3,1'-dihydroxy-4,4'-methylenedi-2-naphthoic acid as off-white crystals; M.P. indefiinite beginning at 201° C. (dec.).

3,1'-dihydroxy-4,4'-methylenedi-2-naphthoic acid, employed as a starting material in the above procedure, is prepared as follows: A slurry of 20.0 g. of 4-(chloromethyl)-3-hydroxy-2-naphthoic acid methyl ester in 500 ml. of hot glacial acetic acid is added to a hot solution of 15.0 g. of 1-hydroxy-2-naphthoic acid in 250 ml. of glacial acetic acid and the mixture is stirred and heated on the steam bath for 3½ hours. Upon cooling, the precipitate is collected by filtration, washed with a small portion of glacial acetic acid and dried in vacuo at 75° C. This is the intermediate 3,1'-dihydroxy-4,4'-methylenedi-2-naphthoic acid 2-methyl ester; M.P. 253–256° C. (dec.). The intermediate acid-ester is dissolved in 500 ml. of 1 N sodium hydroxide solution and the solution is heated on the steam bath for 2 hours and filtered. The filtrate is poured into an excess of dilute hydrochloric acid and the precipitate is collected by filtration, washed with water and dried in vacuo at 75° C. Crystallization from dimethylformamide-water gives the desired 3,1'-dihydroxy-4,4'-methylenedi-2-naphthoic acid; M.P. 255–256° C. (dec.).

In like manner, the following additional compounds are prepared from 3,1' - dihydroxy - 4,4'-methylenedi-2-naphthoic acid and the appropriate dihydrotriazine hydrochloride:

4,6 - diamino - 1,2 - dihydro - 1 - (p-idophenyl)-2,2-dimethyl-s-triazine salt with ½ formula weight 3,1'-dihydroxy-4,4'-methylenedi-2-naphthoic acid; M.P. indefinite beginning at 200° C. (dec.).

4,6 - diamino - 1 - [p-(benzyloxy)phenyl]-1,2-dihydro-2,2-dimethyl-s-triazine salt with ½ formula weight 3,1'-dihydroxy-4,4'-methylenedi-2-naphthoic acid; M.P. indefinite beginning at 188° C. (dec.).

4,6 - diamino-1,2-dihydro-1-(p-ethoxyphenyl)-2,2-dimethyl-s-triazine salt with ½ formula weight 3,1'-dihydroxy-4,4'-methylenedi-2-naphthoic acid; M.P. indefinite beginning at 198° C. (dec.).

4,6 - diamino - 1 - (p-chlorophenyl-1,2-dihydro-2-n-propyl-s-triazine salt with ½ formula weight 3,1'-dihydroxy-4,4'-methylenedi-2-naphthoic acid; M.P. indefiinite beginning at 202° C. (dec.).

4,6 - diamino - 1,2 - dihydro - 2,2-dimethyl-1-($\alpha,\alpha,\alpha$-trifluoro-p-tolyl)-s-triazine salt with ½ formula weight 3,1'-dihydroxy-4,4'-methylenedi-2-naphthoic acid.

4,6 - diamino - 1,2 - dihydro - 2,2-dimethyl-1-[p-(ethylthio)phenyl]-s-triazine salt with ½ formula weight 3,1'-dihydroxy-4,4'-methylenedi-2-naphthoic acid.

*Example 4*

To a warm solution of 2.88 g. of 4,6-diamino-1-(p-chlorophenyl)-1,2-dihydro-2,2-dimethyl-s-triazine monohydrochloride in 40 ml. of water is added a solution of 1.94 g. of 3,6'-dihydroxy-4,5'-methylenedi-2-naphthoic acid in 10 ml. of 1 N sodium hydroxide solution and 20 ml. of water. The precipitate is collected by filtration, washed thoroughly with water and dried in vacuo at 55° C. Crystallization from methanol-water gives the desired 4,6 - diamino-1-(p-chlorophenyl)-1,2-dihydro - 2,2 - dimethyl-s-triazine salt with ½ formula weight 3,6'-dihydroxy-4,5'-methylenedi-2-naphthoic acid as off-white crystals; M.P. indefinite beginning at 224° C. (dec.).

3,6'-dihydroxy-4,5'-methylenedi - 2 - naphthoic acid, M.P. 296–300° C. (dec.), employed as a starting material in the above procedure, is prepared from 4-(chloromethyl)-3-hydroxy-2-naphthoic acid methyl ester and 6-hydroxy-2-naphthoic acid according to the procedures described under Example 3 herein for the preparation of 3,1'-dihydroxy-4,4'-methylenedi-2-naphthoic acid.

In like manner, the following additional compounds are prepared from 3,6'-dihydroxy-4,5'-methylenedi-2-naphthoic acid and the appropriate dihydrotriazine hydrochloride:

4,6-diamino-1,2-dihydro - 1 - (p-iodophenyl)-2,2-dimethyl-s-triazine salt with ½ formula weight 3,6'-dihydroxy-4,5'-methylenedi-2-naphthoic acid; M.P. indefinite beginning at 210° C. (dec.).

4,6-diamino-1-[p-(benzyloxy)phenyl] - 1,2 - dihydro-2,2-dimethyl-s-triazine salt with ½ formula weight 3,6'-dihydroxy-4,5'-methylenedi-2- naphthoic acid; M.P. indefinite beginning at 204° C. (dec.).

4,6-diamino-1-(p-chlorophenyl) - 1,2 - dihydro-2-methyl-s-triazine salt with ½ formula weight 3,6'-dihydroxy-4,5'-methylenedi-2-naphthoic acid.

4,6-diamino-1,2-dihydro - 2,2 - dimethyl-1-($\alpha,\alpha,\alpha$-trifluoro-p-tolyl)-s-triazine salt with ½ formula weight 3,6'-dihydroxy-4,5'-methylenedi-2-naphthoic acid.

4,6 - diamino-1,2-dihydro - 2,2 - dimethyl-1-[p-(methylthio)phenyl]-s-triazine salt with ½ formula weight 3,6'-dihydroxy-4,5'-methylenedi-2-naphthoic acid.

*Example 5*

To a warm solution of 2.88 g. of 4,6-diamino-1-(p-chlorophenyl)-1,2-dihydro-2,2-dimethyl-s-triazine monohydrochloride in 75 ml. of ethanol is added with stirring a solution of 2.01 g. of 4,4'-ethylidenebis(3-hydroxy-2-naphthoic acid) in a mixture of 10 ml. of 1 N sodium hydroxide solution and 50 ml. of acetone. Upon cooling, the precipitate is collected by filtration, washed thoroughly with water and dried in vacuo at 55° C. Crystallization from methanol-water affords the desired 4,6-diamino-1-(p-chlorophenyl)-1,2-dihydro - 2,2 - dimethyl-s-triazine salt with ½ formula weight 4,4'-ethylidenebis(3-hydroxy-2-naphthoic acid) as pale yellow crystals; M.P. indefinite beginning at 219° C. (dec.).

4,4'-ethylidenebis(3-hydroxy-2-naphthoic acid), M.P. 264° C. (dec.), employed as a starting material in the above procedure, is prepared from 3-hydroxy-2-naphthoic acid and paraldehyde according to the procedure described under Example 12 herein for the preparation of 4,4′-methylenebis(1-hydroxy-2-naphthoic acid).

Example 6

A solution of 1.50 g. of 4,4′-methylenebis(7-bromo-3-hydroxy-2-naphthoic acid) in a mixture of 5.5 ml. of 1 N sodium hydroxide solution and 20 ml. of methanol is added to a solution of 2.11 g. of 4,6-diamino-1,2-dihydro-1-(p-iodophenyl) - 2,2-dimethyl - s - triazine monohydrochloride in 100 ml. of hot methanol. The mixture is cooled, concentrated and the pale yellow solid that precipitates is collected by filtration, washed with water and dried in vacuo at 65° C. Crystallization of the product from acetone-water gives the desired 4,6-diamino-1,2-dihydro-1-(p-iodophenyl) - 2,2 - dimethyl-s-triazine salt with ½ formula weight 4,4′-methylenebis(7-bromo-3-hydroxy-2-naphthoic acid) ¼ hydrate as yellow crystals; M.P. indefinite beginning at 222° C. (dec.).

4,4′-methylenebis(7-bromo-3-hydroxy - 2 - naphthoic acid) employed as a starting material in the above procedure is prepared as follows: A mixture of 26.7 g. of 7-bromo-3-hydroxy-2-naphthoic acid, 6.0 g. of sodium hydroxide and 700 ml. of water is heated to 90° C. on the steam bath and 6.0 ml. of 40% formaldehyde solution is added. The resulting light brown solution is stirred and heated on the steam bath for 2 hours and cooled. The precipitate is collected by filtration, dissolved in hot water, filtered, and the filtrate acidified with hydrochloric acid. The precipitate is collected by filtration and dried in vacuo at 65° C. The bright yellow solid thus obtained is the desired 4,4′-methylenebis(7-bromo-3-hydroxy-2-naphthoic acid); M.P. 330–335° C. (dec.).

In similar manner, the following additional compounds are prepared from 4,4′-methylenebis(7-bromo-3-hydroxy-2-naphthoic acid) and the appropriate dihydrotriazine hydrochloride:

4,6-diamino-1-(p-chlorophenyl)-1,2-diyhdro-2,2 - dimethyl-s-triazine salt with ½ formula weight, 4,4′-methylenebis(7-bromo-3-hydroxy-2-naphthoic acid); M.P. 205° C. (dec.).

4,6-diamino-1,2-dihydro-2,2-dimethyl-1-p-tolyl - s - triazine salt with ½ formula weight 4,4′-methylenebis(7-bromo-3-hydroxy-2-naphthoic acid) hemihydrate; M.P. indefinite beginning at 206° C. (dec.).

4,6-diamino-1-(p-ethylphenyl)-1,2-dihydro-2,2 - dimethyl-s-triazine salt with ½ formula weight 4,4′-methylenebis(7-bromo-3-hydroxy-2-naphthoic acid) hemihydrate; M.P. indefinite beginning at 211° C. (dec.).

4,6-diamino-1-(p-chlorophenyl)-1,2-dihydro-2 - methyl - s-triazine salt with ½ formula weight 4,4′-methylenebis(7-bromo-3-hydroxy-2-naphthoic acid) hemihydrate; M.P. indefinite beginning at 214° C. (dec.).

4,6-diamino-1-(p-chlorophenyl)-2-ethyl - 1,2 - dihydro - s-triazine salt with ½ formula weight 4,4′-methylenebis(7-bromo-3-hydroxy-2-naphthoic acid) ¾ hydrate; M.P. indefinite beginning at 211° C. (dec.).

4,6-diamino-1-(p-chlorophenyl)-2-n-propyl-1,2 - dihydro-s-triazine salt with ½ formula weight 4,4′-methylenebis(7-bromo-3-hydroxy-2-naphthoic acid); M.P. indefinite beginning at 202° C. (dec.).

4,6-diamino-1-(p-bromophenyl)-1,2-dihydro - 2,2 - dimethyl-s-triazine salt with ½ formula weight 4,4′-methylenebis(7-bromo-3-hydroxy-2-naphthoic acid); M.P. indefinite beginning at 204° C. (dec.).

4,6-diamino-1,2-dihydro-1 - (p - methoxyphenyl) - 2,2 - dimethyl-s-triazine salt with ½ formula weight, 4,4′methylenebis(7-bromo-3-hydroxy-2-naphthoic acid) hemihydrate; M.P. indefinite beginning at 214° C. (dec.).

4,6-diamino-1,2-dihydro-1-(p-ethoxyphenyl)-2,2 - dimethyl-s-triazine salt with ½ formula weight 4,4′-methylenebis(7-bromo-3-hydroxy-2-naphthoic acid); M.P. indefinite beginning at 211° C.

4,6-diamino-1-[p-(benzyloxy)phenyl] - 1,2 - dihydro - 2,2-dimethyl-s-triazine salt with ½ formula weight 4,4′-methylenebis(7-bromo-3 - hydroxy - 2 - naphthoic acid) monohydrate. M.P. indefinite beginning at 184° C. (dec.).

4,6-diamino-1,2-dihydro-2,2-dimethyl-1 - ($\alpha,\alpha,\alpha$ - trifluoro-p-tolyl)-s-triazine salt with ½ formula weight, 4,4′-methylenebis(7-bromo-3- hydroxy - 2 - naphthoic acid) hemihydrate; M.P. indefinite beginning at 220° C. (dec.).

4,6-diamino-1,2-dihydro-2,2-dimethyl-1-[p - (methylthio)phenyl]-s-triazine salt with ½ formula weight 4,4′-methylenebis(7-bromo-3 - hydroxy - 2 - naphthoic acid) hemihydrate; M.P. indefinite beginning at 217° C. (dec.).

Example 7

To a warm solution of 2.18 g. of 4,6-diamino-1-[p-(benzyloxy)phenyl]-1,2-dihydro-2,2-dimethyl - s -triazine monohydrochloride dihydrate in 50 ml. of water is added a solution of 1.46 g. of 6,6′-dibromo-2,2′-dihydroxy-(1,1′-binaphthalene)-3,3′-dicarboxylic acid in 20 ml. of water containing 5.5 ml. of 1 N sodium hydroxide solution. The precipitate is collected by filtration, washed thoroughly with water and dried in vacuo at 65° C. Crystallization from acetone-water gives the desired 4,6-diamino-1-[p-(benzyloxy)phenyl]-1,2-dihydro-2,2-dimethyl - s - triazine salt with ½ formula weight 6,6′-dibromo-2,2′-dihydroxy(1,1′-binaphthalene)-3,3′-dicarboxylic acid as yellow crystals; M.P. indefinite beginning at 218° C. (dec.).

6,6′-dibromo-2,2′-dihydroxy(1,1′-binaphthalene) - 3,3′-dicarboxylic acid employed as a starting material in the above procedure is prepared as follows: To a solution of 4.4 g. of sodium hydroxide and 29.4 g. of 7-bromo-3-hydroxy-2-naphthoic acid in 850 ml. of boiling water is added dropwise a solution of 33 g. of ferric chloride hexahydrate in 70 ml. of water. The reaction mixture is stirred and boiled under reflux for 30 minutes, filtered, and the precipitate stirred with 2 liters of 18% hydrochloric acid on the steam bath for 1 hour. The yellow-green solid is collected by filtration, washed thoroughly with water and dried in vacuo at 45° C. Crystallization of the crude acid from an ethanol-water mixture gives the desired 6,6′-dibromo-2,2′-dihydroxy(1,1′-binaphthalene) - 3,3′ - dicarboxylic acid as yellow crystals; M.P. 357° C. (dec.).

4,6-diamino-1-[p-benzyloxy)phenyl]-1,2 - dihydro - 2,2-dimethyl-s-triazine monohydrochloride dihydrate employed as a starting material in the above procedure is prepared as follows: A mixture of 146 g. of p-benzyloxyaniline, 300 ml. of acetone, 95 ml. of concentrated hydrochloric acid, 750 ml. of methanol and 66 g. of dicyandiamide is boiled under reflux for 17 hours. The reaction mixture is cooled and the precipitate is collected by filtration and crystallized from water containing a few drops of concentrated hydrochloric acid. The colorless crystals thus obtained are the desired 4,6-diamino-1-[p-(benzyloxy)phenyl]-1,2-dihydro-2,2-dimethyl-s-triazine monohydrochloride dihydrate; M.P. 216–220° C.

In similar manner, the following additional compounds are prepared from 6,6′ - dibromo - 2,2′-dihydroxy(1,1′-binaphthalene)-3,3′-dicarboxylic acid and the appropriate dihydrotriazine hydrochloride:

4,6 - diamino - 1 - (p-chlorophenyl) - 1,2-dihydro-2,2-dimethyl-s-triazine salt with ½ formula weight 6,6′-dibromo - 2,2′ - dihydroxy(1,1′ - binaphthalene)-3,3′-dicarboxylic acid ¼ hydrate; M.P. 206° C. (dec.).

4,6 - diamino-1-(p-ethylphenyl)-1,2-dihydro-2,2-dimethyl-s-triazine salt with ½ formula weight 6,6′-dibromo-2,2′ - dihydroxy(1,1′ - binaphthalene)-3,3′-dicarboxylic acid ⅛ hydrate; M.P. indefinite beginning at 213° C. (dec.).

4,6 - diamino - 1 - (p-chlorophenyl)-2-ethyl-1,2-dihydro-s-triazine salt with ½ formula weight 6,6′-dibromo-2,2′-dihydroxy(1,1′ - binaphthalene)-3,3′-dicarboxylic acid ¼ hydrate; M.P. indefinite beginning at 221° C. (dec.).

4,6 - diamino-1,2-dihydro-1-(p-iodophenyl)-2,2-dimethyl-s-triazine salt with ½ formula weight 6,6'-dibromo-2,2' - dihydroxy(1,1' - binaphthalene)-3,3'-dicarboxylic acid ¼ hydrate; M.P. indefinite beginning at 229° C. (dec.).

4,6 - diamino-1,2-dihydro-2,2-dimethyl-1-($\alpha,\alpha,\alpha$-trifluoro-p-tolyl)-s-triazine salt with ½ formula weight 6,6'-dibromo - 2,2'-dihydroxy(1,1'-binaphthalene)-3,3'-dicarboxylic acid; M.P. indefinite beginning at 228° C. (dec.).

Example 8

To a warm solution of 2.88 g. of 4,6-diamino-1-(p-chlorophenyl) - 1,2-dihydro-2,2-dimethyl-s-triazine monohydrochloride in 100 ml. of methanol is added a solution of 2.34 g. of 7-bromo-4,4'-methylenebis(3-hydroxy-2-naphthoic acid) in 10 ml. of 1 N sodium hydroxide solution and 30 ml. of 2-propanol. Upon cooling, the precipitate is collected by filtration, washed thoroughly with water and dried in vacuo at 55° C. Crystallization from methanol-water gives the desired 4,6-diamino-1-(p-chlorophenyl)-1,2-dihydro-2,2-dimethyl-s-triazine salt with ½ formula weight 7-bromo-4,4'-methylenebis(3-hydroxy-2-naphthoic acid); M.P. 200° C. (dec.).

7 - bromo - 4,4' - methylenebis(3-hydroxy-2-naphthoic acid), M.P. 305–307° C., employed as a starting material in the above procedure is prepared from 4-(chloromethyl)-3-hydroxy-2-naphthoic acid methyl ester and 7-bromo-3-hydroxy-2-naphthoic acid according to the procedure described under Example 3 herein for the preparation of 3,1'-dihydroxy-4,4'-methylenedi-2-naphthoic acid.

Example 9

A solution of 2.34 g. of 7-bromo-3,1'-dihydroxy-4,4'-methylenedi-2-naphthoic acid in 10 ml. of 1 N sodium hydroxide solution and 20 ml. of water is added to a warm solution of 2.88 g. of 4,6-diamino-1-(p-chlorophenyl)-1,2-dihydro-2,2-dimethyl-s-triazine monohydrochloride in 40 ml. of water. The precipitate is collected by filtration, washed thoroughly with water and dried in vacuo at 55° C. Crystallization from methanol-water gives the desired 4,6 - diamino - 1 - (p - chlorophenyl)-1,2-dihydro-2,2-dimethyl-s-triazine salt with ½ formula weight 7-bromo-3,1'-dihydroxy-4,4'-methylenedi-2-naphthoic acid as pale yellow crystals; M.P. 213° C. (dec.).

7 - bromo-3,1'-dihydroxy-4,4'-methylenedi-2-naphthoic acid, employed as a starting material in the above procedure, is prepared as follows: A mixture of 28.1 g. of 7-bromo-3-hydroxy-2-naphthoic acid methyl ester, 25 ml. of formalin and 200 ml. of concentrated hydrochloric acid is allowed to stand at room temperature for 2 days with occasional shaking. The precipitate is collected by filtration, dried in vacuo at 45° C. and crystallized from ethyl acetate. This product, M.P. 191–200° C., is the intermediate 7 - bromo - 4-(chloromethyl)-3-hydroxy-2-naphthoic acid methyl ester which is subsequently allowed to react with 1-hydroxy-2-naphthoic acid according to the procedure described under Example 3 herein for the preparation of 3,1' - dihydroxy - 4,4'-methylenedi-2-naphthoic acid.

Example 10

A solution of 2.34 g. of 7-bromo-3,6'-dihydroxy-4,5'-methylenedi-2-naphthoic acid in 10 ml. of 1 N sodium hydroxide solution and 20 ml. of water is added to a warm solution of 2.88 g. of 4,6-diamino-1-(p-chlorophenyl)-1,2-dihydro-2,2-dimethyl-s-triazine monohydrochloride in 40 ml. of water. The precipitate is collected by filtration, washed thoroughly with water and dried in vacuo at 55° C. Crystallization from methanol-water gives the desired 4,6 - diamino - 1 - (p - chlorophenyl)-1,2-dihydro-2,2-dimethyl-s-triazine salt with ½ formula weight 7-bromo-3,6'-dihydroxy-4,5'-methylenedi-2-naphthoic acid as pale yellow crystals; M.P. 206° C. (dec.).

7 - bromo - 3,6'-dihydroxy-4,5'-methylenedi-2-naphthoic acid, employed as a starting material in the above procedure, is prepared from 7-bromo-4-(chloromethyl)-3-hydroxy-2-naphthoic acid methyl ester and 6-hydroxy-2-naphthoic acid according to the procedure described under Example 9 herein for the preparation of 7-bromo-3,1'-dihydroxy-4,4'-methylenedi-2-naphthoic acid.

Example 11

To a warm solution of 3.75 g. of 4,6-diamino-1-(p-chlorophenyl) - 1,2-dihydro-2,2-dimethyl-s-triazine monohydrochloride in 40 ml. of water is added a solution of 2.45 g. of 4,4'-dihydroxy(1,1'-binaphthalene)-3,3'-dicarboxylic acid in 13 ml. of 1 N sodium hydroxide solution and 80 ml. of water. The precipitate is collected by filtration, washed thoroughly with water, and dried in vacuo at 65° C. Crystallization of the crude salt from a mixture of dimethylformamide, methanol and water gives the desired 4,6-diamino-1-(p-chlorophenyl)-1,2-dihydro-2,2-dimethyl-s-triazine salt with ½ formula weight 4,4'-dihydroxy-(1,1'-binaphthalene)-3,3'-dicarboxylic acid hemihydrate as tan crystals; M.P. 206° C. (dec.).

4,4' - dihydroxy(1,1' - binaphthalene) - 3,3' - dicarboxylic acid employed as a starting material in the above procedure is prepared as follows: To a solution of 4.0 g. of sodium hydroxide in 300 ml. of water is added 18.8 g. of 1-hydroxy-2-naphthoic acid. The mixture is heated to boiling and a solution of 30 g. of ferric chloride hexahydrate in 80 ml. of water is added dropwise with stirring. The mixture is stirred and boiled for one-half hour, filtered hot, and the filter cake is washed with water. The crude product is stirred with 200 ml. of 18% hydrochloric acid on the steam bath for one hour, the mixture is filtered hot, and the filter cake washed with water and dried. The acid is dissolved in dilute potassium hydroxide, reprecipitated with acid and crystallized from dimethylformamide-water. The tan solid thus obtained, M.P. 296–297° C. (dec.), is the desired 4,4' - dihydroxy(1,1' - binaphthalene) - 3,3' - dicarboxylic acid.

In like manner, the following additional compounds are prepared starting from 4,4'-dihydroxy(1,1'-binaphthalene)-3,3'-dicarboxylic acid and the appropriate dihydrotriazine hydrochloride:

4,6-diamino-1-(p-ethylphenyl)-1,2-dihydro-2,2-dimethyl-s-triazine salt with ½ formula weight 4,4'-dihydroxy(1,1'-binaphthalene)-3,3'-dicarboxylic acid; M.P. 199–201° C.

4,6-diamino-1,2-dihydro-1-(p-iodophenyl)-2,2-dimethyl-s-triazine salt with ½ formula weight 4,4'-dihydroxy(1,1'-binaphthalene)-3,3-dicarboxylic acid; M.P. 216–218° C.

4,6-diamino-1,2-dihydro-1-(p-methoxyphenyl)-2,2-dimethyl-s-triazine salt with ½ formula weight 4,4'-dihydroxy(1,1'-binaphthalene)-3,3'-dicarboxylic acid; M.P. 205–207° C.

4,6-diamino-1-[p-(benzyloxy)phenyl]-1,2-dihydro-2,2-dimethyl-s-triazine salt with ½ formula weight 4,4'-dihydroxy(1,1'-binaphthalene)-3,3'-dicarboxylic acid; M.P. indefinite beginning at 178° C. (dec.).

4,6-diamino-1,2-dihydro-2,2-dimethyl-1-($\alpha,\alpha,\alpha$-trifluoro-p-tolyl)-s-triazine salt with ½ formula weight 4,4'-dihydroxy(1,1'-binaphthalene)-3,3'-dicarboxylic acid; M.P. indefinite beginning at 208–210° C. (dec.).

Example 12

To a warm solution of 5.76 g. of 4,6-diamino-1-(p-chlorophenyl)-1,2-dihydro-2,2-dimethyl-s-triazine monohydrochloride in 200 ml. of water is added a solution of 3.88 g. of 4,4'-methylenebis(1-hydroxy-2-naphthoic acid) in 20 ml. of 1 N sodium hydroxide solution and 50 ml. of water. The precipitate is collected by filtration, washed thoroughly with water, and dried in vacuo at 65° C. Crystallization from ethanol-water gives the desired 4,6 - diamino-1-(p-chlorophenyl)-1,2-dihydro-2,2-dimethyl-s-triazine salt with ½ formula weight 4,4'- methylenebis (1-hydroxy-2-naphthoic acid) ¼ hydrate as off-white crystals; M.P. 206–208° C. (dec.).

4,4' - methylenebis(1 - hydroxy - 2 - naphthoic acid) employed as a starting material in the above procedure is prepared as follows: To a hot solution of 282.3 g. of 1-hydroxy-2-naphthoic acid in 3 liters of glacial acetic acid there is added with stirring 113 ml. of 37% aqueous formaldehyde followed by 75 ml. of concentrated hydrochloric acid. The mixture is stirred and heated on the steam bath for 45 minutes and cooled. The precipitate is collected by filtration, washed thoroughly with water and dried in vacuo at 55° C. Crystallization from dimethylformamide-water gives the desired intermediate as off-white crystals; M.P. 276° C. (dec.).

In like manner, the following additional compounds are prepared from 4,4' - methylenebis(1 - hydroxy - 2-naphthoic acid) and the appropriate dihydrotriazine hydrochloride:

4,6-diamino-1-(p-ethylphenyl)-1,2-dihydro-2,2-dimethyl-s-triazine salt with ½ formula weight 4,4'-methylenebis(1-hydroxy-2-naphthoic acid); M.P. indefinite beginning at 179° C. (dec.).

4,6-diamino-1,2-dihydro-1-(p-iodophenyl)-2,2-dimethyl-s-triazine salt with ½ formula weight 4,4'-methylenebis(1-hydroxy-2-naphthoic acid); M.P. indefinite beginning at 182° C. (dec.).

4,6-diamino-1,2-dihydro-1-(p-methoxyphenyl)-2,2-dimethyl-s-triazine salt with ½ formula weight 4,4'-methylenebis(1-hydroxy-2-naphthoic acid); M.P. 223–226° C. (dec.).

4,6-diamino-1-[p-(benzyloxy)phenyl]-1,2-dihydro-2,2-dimethyl-s-triazine salt with ½ formula weight 4,4'-methylenebis(1-hydroxy-2-naphthoic acid); M.P. 193–195° C. (dec.).

4,6-diamino-1,2-dihydro-2,2-dimethyl-1-($\alpha,\alpha,\alpha$-trifluoro-p-tolyl)-s-triazine salt with ½ formula weight 4,4'-methylenebis(1-hydroxy-2-naphthoic acid); M.P. 212–213° C. (dec.).

4,6-diamino-1,2-dihydro-2,2-dimethyl-1-[p-(methylthio)phenyl]-s-triazine salt with ½ formula weight 4,4' methylenebis(1-hydroxy-2-naphthoic acid); M.P. 180–182° C. (dec.).

4,6-diamino-1-(p-chlorophenyl)-2-ethyl-1,2-dihydro-s-triazine salt with ½ formula weight 4,4'-methylenebis(1-hydroxy-2-naphthoic acid); M.P. 206–207° C. (dec.).

Example 13

A solution of 2.32 g. of 4,4'-benzylidenebis(1-hydroxy-2-naphthoic acid) in a mixture of 80 ml. of water and 10 ml. of 1 N sodium hydroxide solution is poured into a warm solution of 2.88 g. of 4,6-diamino-1-(p-chlorophenyl)-1,2-dihydro-2,2 - dimethyl-s-triazine monohydrochloride in 40 ml. of water. The precipitate that forms is collected by filtration, washed thoroughly with warm water and dried in vacuo at 65° C. for 18 hours. Crystallization of the product from methanol-water gives the desired 4,6-diamino-1-(p-chlorophenyl)-1,2-dihydro-2,2-dimethyl-s-triazine salt with ½ formula weight 4,4'-benzylidenebis(1-hydroxy-2-naphthoic acid) off-white crystals; M.P. 218° C. (dec.).

4,4'-benzylidenebis(1-hydroxy-2-naphthoic acid), M.P. 303° C. (dec.), employed as a starting material in the above procedure is prepared from 1-hydroxy-2-naphthoic acid and benzaldehyde according to the procedure described under Example 12 herewith for the preparation of 4,4'-methylenebis(1-hydroxy-2-naphthoic acid).

Example 14

To a warm solution of 3.84 g. of 4,6-diamino-1,2-dihydro-1-(p-iodophenyl)-2,2-dimethyl-s-triazine monohydrochloride in 35 ml. of water is added a filtered solution of 2.07 g. of 4,4'-thiobis(3-hydroxy-2-naphthoic acid) in a mixture of 10 ml. of 1 N sodium hydroxide solution and 20 ml. of water. The insoluble salt that precipitates is collected by filtration, washed thoroughly with water and dried in vacuo at 50° C. Crystallization of the product from methanol-water gives the desired 4,6-diamino-1,2-dihydro-1-(p-iodophenyl)-2,2-dimethyl-s-triazine salt with ½ formula weight 4,4' - thiobis(3 - hydroxy-2-naphthoic acid) 1¼ hydrate as yellow crystals; M.P. 209° C. (dec.).

4,4'-thiobis(3-hydroxy-2-naphthoic acid) employed as a starting material in the above procedure is prepared as follows: To a mixture of 40.4 g. of 3-hydroxy-2-naphthoic acid methyl ester and 30.5 ml. of thionyl chloride is added slowly with mechanical stirring 20.0 g. of copper powder. The reaction mixture is allowed to stir at room temperature for 18 hours and is subsequently heated on the steam bath for one-half hour. The mixture is cooled and slurried successively with chloroform and acetone. The insoluble residue is dried in vacuo at 50° C. A portion of the crude intermediate weighing 15.0 g. is stirred and heated on the steam bath with 150 ml. of 10% sodium hydroxide solution for 4 hours and is subsequently allowed to stir at room temperature for 19 hours. The reaction mixture is filtered and the filtrate is acidified to pH 3 by the addition of dilute hydrochloric acid. The yellow solid that precipitates is collected by filtration, dried and crystallized from a mixture of dimethylformamide and water. This is the desired intermediate 4,4'-thiobis(3-hydroxy-2-naphthoic acid); M.P. 321–322.5° C.

In like manner, the following additional compounds are prepared from 4,4'-thiobis(3-hydroxy-2-naphthoic acid) and the appropriate dihydrotriazine hydrochloride:

4,6-diamino-1-(p-chlorophenyl)-1,2-dihydro-2,2 - dimethyl-s-triazine salt with ½ formula weight 4,4'-thiobis(3-hydroxy-2-naphthoic acid) monohydrate; M.P. 204° C. (dec.).

4,6-diamino-1,2-dihydro-2,2-dimethyl - 1 - (p-tolyl)-s-triazine salt with ½ formula weight 4,4'-thiobis(3-hydroxy-2-naphthoic acid) hydrate; M.P. 207° C. (dec.).

4,6-diamino-1-(p-ethylphenyl)-1,2-dihydro-2,2 - dimethyl-s-triazine salt with ½ formula weight 4,4'-thiobis(3-hydroxy-2-naphthoic acid); M.P. 183° C. (dec.).

4,6 - diamino - 1 - (p-chlorophenyl)-2-ethyl-1,2-dihydro-s-triazine salt with ½ formula weight 4,4'-thiobis(3-hydroxy-2-naphthoic acid); M.P. 216° C. (dec.).

4,6-diamino-1-[p-(benzyloxy)phenyl] - 1,2 - dihydro-2,2-dimethyl-s-triazine salt with ½ formula weight 4,4'-thiobis(3-hydroxy-2-naphthoic acid); M.P. 203° C. (dec.).

4,6-diamino-1,2-dihydro-2,2 - dimethyl-1-[p-(methylthio)phenyl]-s-triazine salt with ½ formula weight 4,4'-thiobis(3-hydroxy-2-naphthoic acid) hemihydrate; M.P. 203° C. (dec.).

4,6-diamino-1,2-dihydro - 2,2 - dimethyl-1-($\alpha,\alpha,\alpha$-trifluoro-p-tolyl)-s-triazine salt with ½ formula weight 4,4'-thiobis(3-hydroxy-2-naphthoic acid) hemihydrate; M.P. 205° C. (dec.).

Example 15

(a) To a warm solution of 8.65 g. of 4,6-diamino-1-(p-chlorophenyl)-1,2-dihydro-2,2-dimethyl-s-triazine monohydrochloride in 100 ml. of water is added to filtered solution of 4.59 g. of 5,5'-thiodisalicylic acid in 200 ml. of water containing 30 ml. of 1 N sodium hydroxide solution. The salt that separates is collected by filtration, washed thoroughly with water, and dried in vacuo. Crystallization of the crude salt from a methanol-water mixture gives the desired 4,6-diamino-1-(p-chlorophenyl)-1,2-dihydro-2,2-dimethyl-s-triazine salt with ½ formula weight 5,5'-thiodisalicylic acid as colorless crystals; M.P. 212–214° C. (dec.).

(b) A solution of 14.4 g. of 4,6-diamino-1-(p-chlorophenyl)-1,2-dihydro-2,2-dimethyl-s-triazine monohydrochloride in 50 ml. of 1 N hydrochloric acid and 500 ml. of water is poured into a hot, filtered solution of 15.3 g. of 5,5'-thiodisalicylic acid in a mixture of 100 ml. of 1 N sodium hydroxide and 200 ml. of water. Upon cooling, the precipitate is collected by filtration and dried in vacuo at 55° C. This is the desired 4,6-diamino-1-(p-chlorophenyl)-1,2-dihydro-2,2-dimethyl-s-triazine salt with 1 formula weight 5,5'-thiodisalicylic acid ¼ hydrate off-white crystals; M.P. 180–182° C.

In similar manner, the following additional compounds are prepared from 5,5'-thiodisalicylic acid and the appropriate dihydrotriazine hydrochloride:

4,6 - diamino - 1,2 - dihydro - 2,2 - dimethyl - 1 - p - tolyl-s-triazine salt with ½ formula weight 5,5'-thiodisalicylic acid; M.P. 221–222° C.

4,6 - diamino - 1 - (p - ethylphenyl) - 1,2 - dihydro - 2,2-dimethyl-s-triazine salt with ½ formula weight of 5,5'-thiodisalicylic acid; M.P. 196–198° C.

4,6 - diamino - 1 - (p - chlorophenyl) - 1,2 - dihydro - 2-methyl-s-triazine salt with ½ formula weight 5,5'-thiodisalicylic acid hydrate; M.P. 221–222° C.

4,6 - diamino - 1 - (p - chlorophenyl) - 2 - ethyl - 1,2-dihydro-s-triazine salt with ½ formula weight 5,5'-thiodisalicylic acid; M.P. 214–215° C.

4,6 - diamino - 1,2 - dihydro - 1 - (p - iodophenyl) - 2,2-dimethyl-s-triazine salt with ½ formula weight 5,5'-thiodisalicylic acid; M.P. 200–201° C.

4,6 - diamino - 1,2 - dihydro - 2,2 - dimethyl - 1 - (α,α,α-trifluoro-p-tolyl)-s-triazine salt with ½ formula weight 5,5'-thiodisalicylic acid; M.P. 194–196° C.

4,6 - diamino - 1 - [p - (benzyloxy)phenyl] - 1,2 - dihydro-2,2-dimethyl-s-triazine salt with ½ formula weight 5,5'-thiodisalicylic acid; M.P. 203–205° C.

*Example 16*

A solution of 7.12 g. of fluorescein disodium salt in 150 ml. of water is poured slowly with stirring into a solution of 10.9 g. of 4,6-diamino-1-(p-chlorophenyl)-1,2-dihydro-2,2-dimethyl-s-triazine monohydrochloride in 500 ml. of water. The reaction mixture is cooled and the insoluble salt that precipitates is collected by filtration and dried in vacuo at 50° C. for 18 hours. Crystallization from methanol-ether gives the desired 4,6-diamino-1-(p-chlorophenyl-1,2-dihydro-2,2-dimethyl-s-triazine salt with ½ formula weight fluorescein monohydrate as orange crystals; M.P. indefinite beginning at 210° C. (dec.).

In like manner, the following compounds are prepared starting from the appropriate fluorescein derivative and dihydrotriazine monohydrochloride:

4,6 - diamino - 1 - (p - ethylphenyl) - 1,2 - dihydro - 2,2-dimethyl-s-triazine salt with 1 formula weight fluorescein; M.P. 221–224° C. (dec.).

4,6 - diamino - 1,2 - dihydro - 1 - (p - iodophenyl) - 2,2-dimethyl-s-trazine salt with ½ formula weight fluorescein; M.P. 223–226° C. (dec.).

4,6 - diamino - 1 - [p - (benzyloxy)phenyl] - 1,2 - dihydro-2,2-dimethyl-s-triazine salt with ½ formula weight fluorescein; M.P. 188–198° C. (dec.).

4,6 - diamino - 1,2 - dihydro - 2,2 - dimethyl - 1 - (α,α,α-trifluoro-p-tolyl)-s-triazine salt with ½ formula weight fluorescein; M.P. 218° C. (dec.).

4,6 - diamino - 1,2 - dihydro - 2,2 - dimethyl - 1 - [p-(methylthio)phenyl]-s-triazine salt with ½ formula weight fluorescein.

4,6 - diamino - 1 - (p - chlorophenyl - 1,2 - dihydro - 2,2-dimethyl-s-triazine salt with ½ formula weight 2',7'-dichlorofluorescein; M.P. indefinite beginning at 229–239° C. (dec.).

4,6 - diomina - 1 - (p - chlorophenyl) - 1,2 - dihydro - 2,2-dimethyl-s-triazine salt with ½ formula weight 4',5'-dibromofluorescein; M.P. 244° C. (dec.).

4,6 - diamino - 1 - (p - chlorophenyl) - 1,2 - dihydro - 2,2-dimethyl-s-triazine salt with ½ formula weight 2',4',5',7'-tetrabromofluorescein; M.P. indefinite beginning at 241–249° C. (dec.).

4,6 - diamino - 1 - (p - chlorophenyl) - 1,2 - dihydro - 2,2-dimethyl-s-triazine salt with ½ formula weight erythrosin; M.P. 234–236° C. (dec.).

4,6 - diamino - 1 - (p - chlorophenyl) - 1,2 - dihydro - 2,2-dimethyl-s-triazine salt with ½ formula weight 4',5'-dibromo-2',7'-dinitrofluorescein; M.P. indefinite beginning at 204–214° C. (dec.).

4,6 - diamino - 1 - (p - chlorophenyl ) -2 - ethyl - 1,2-dihydro-s-triazine salt with ½ formula weight 2',7'-dichlorofluorescein.

*Example 17*

A solution of 3.31 g. of fluorescin in 20 ml. of 1 N sodium hydroxide solution and 75 ml. of water is poured slowly with stirring into a solution of 5.76 g. of 4,6-diamino-1-(p - chlorophenyl)-1,2-dihydro-2,2-dimethyl - s-triazine monohydrochloride in 200 ml. of water. Upon cooling, the precipitate is collected by filtration, washed thoroughly with water and dried in vacuo at 50° C. for 18 hours. Crystallization from methanol-ether gives the desired 4,6-diamino-1-(p-chlorophenyl)-1,2-dihydro-2,2-dimethyl-s-triazine salt with ½ formula weight fluorescin as yellow crystals; M.P. 206° C. (dec.).

We claim:

1. 4,6 - diamino - 1,2 - dihydro - 1 - (p - iodophenyl)-2,2-dimethyl-s-triazine salt with ½ formula weight 4,4'-thiobis(3-hydroxy-2-naphthoic acid).

2. 4,6 - diamino - 1 - (p - chlorophenyl) - 2 - ethyl - 1,2-dihydro-s-triazine salt with ½ formula weight 4,4'-benzylidenebis(3-hydroxy-2-naphthoic acid).

3. 4,6 - diamino - 1,2 - dihydro - 1 - (p - iodophenyl)-2,2-dimethyl-s-triazine salt with ½ formula weight 4,4'-methylenebis(7-bromo-3-hydroxy-2-naphthoic acid).

4. 4,6 - diamino - 1 - (p - ethylphenyl) - 1,2 - dihydro-2,2 - dimethyl-s-triazine salt with ½ formula weight 5,5'-thiodisalicylic acid.

5. 4,6 - diamino - 1,2 - dihydro - 1 - (p - iodophenyl)-2,2-dimethyl-s-triazine salt with ½ formula weight 6,6'-dibromo - 2,2' - dihydroxy(1,1' - binaphthalene) - 3,3'-dicarboxylic acid.

References Cited by the Examiner

UNITED STATES PATENTS 1,872,826    8/1932   Schulemann et al. _____ 260—286
2,900,385    8/1959   Modest _____ 260—249.9

FOREIGN PATENTS 813,560    5/1959   Great Britain.

OTHER REFERENCES

Barber et al.: "Journal of Applied Chemistry," vol. 2, part 10, October 1952, pages 565–575.

Cram et al.: "Organic Chemistry," McGraw-Hill Book Company, Inc. 1959, page 362.

Karrer: "Organic Chemistry," Nordemann Publishing Co., Inc., New York, 1938.

Royals: "Advanced Organic Chemistry," Prentice-Hall, Inc. 1954, pages 462, 463.

Whitmore: "Organic Chemistry," D. Van Nostrand Company, Inc., New York, 1951, page 731.

WALTER A. MODANCE, *Primary Examiner.*

IRVING MARCUS, NICHOLAS S. RIZZO, *Examiners.*